L. D. JONES.
VEHICLE SPRING.
APPLICATION FILED FEB. 1, 1912.
1,032,681.
Patented July 16, 1912.
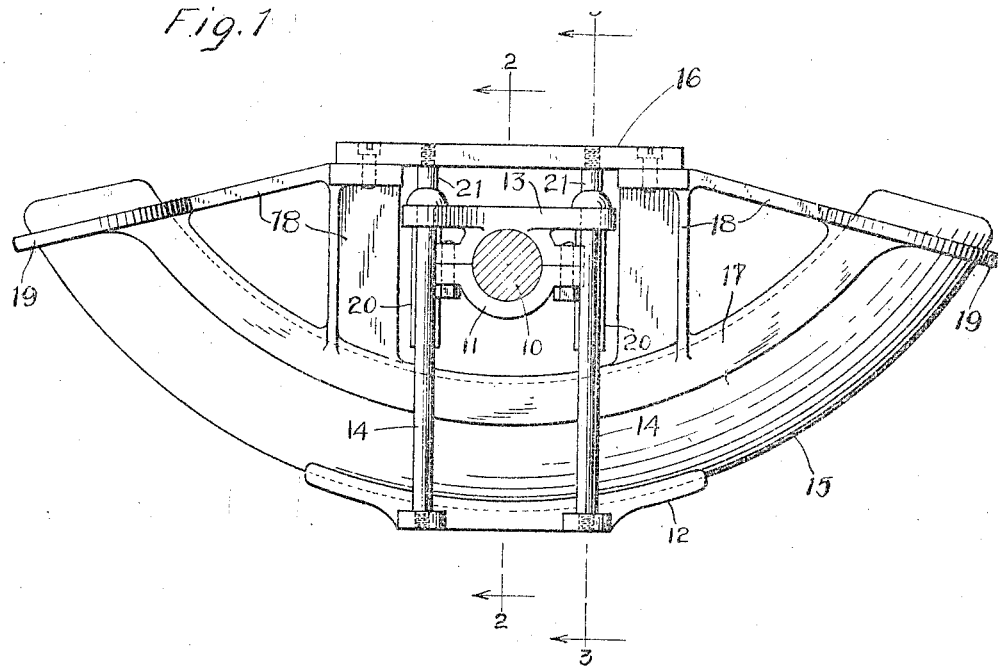
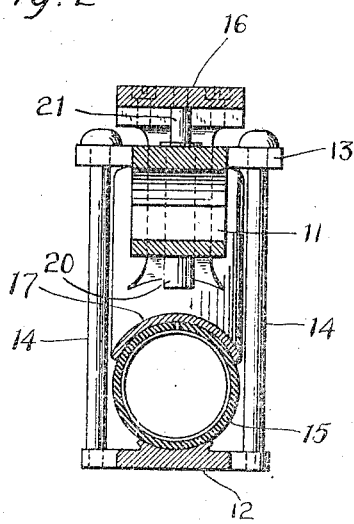
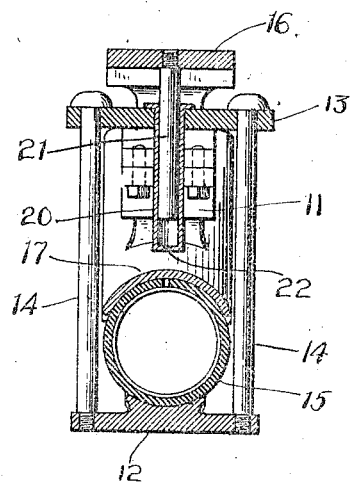
WITNESSES:
H. W. Meade
S. W. Atherton
INVENTOR
Lyman D. Jones
BY
F. M. Wooster
ATTORNEY

UNITED STATES PATENT OFFICE.

LYMAN D. JONES, OF BRIDGEPORT, CONNECTICUT, ASSIGNOR TO ETTA E. BRANDEAU, OF BRIDGEPORT, CONNECTICUT.

VEHICLE-SPRING.

1,032,681.

Specification of Letters Patent.

Patented July 16, 1912.

Application filed February 1, 1912. Serial No. 674,767.

*To all whom it may concern:*

Be it known that I, LYMAN D. JONES, a citizen of the United States, residing at Bridgeport, county of Fairfield, State of Connecticut, have invented an Improvement in Vehicle-Springs, of which the following is a specification.

This invention has for its object to produce a spring adapted for general use upon all kinds of vehicles and especially adapted for use upon motor cars and trucks, and which is adapted to be used independently of or in connection with other springs, or as a shock absorber, the essential feature of which is that a suspended pneumatic cushion in connection with guide tubes and plungers is substituted for the various types of metallic springs now in use, thus enabling the builder to save room in the vehicle and to provide an exceedingly easy riding spring having all the advantages of high grade pneumatic tires and which in many instances will make the use of pneumatic tires unnecessary, thereby effecting an important saving in both the initial cost and the running cost of motor cars and trucks.

In the accompanying drawing forming a part of this specification, Figure 1 is an elevation illustrating the application of my novel spring to an axle which is shown in section; Fig. 2 a section on the line 2—2 in Fig. 1, looking in the direction of the arrows; and Fig. 3 is a section on the line 3—3 in Fig. 1, looking in the direction of the arrows.

My novel spring comprises a rest suspended from the axle, a pneumatic cushion carried by the rest which supports the weight and guide tubes and plungers carried respectively by the axle and the cushion.

10 denotes an axle which passes through an axle box 11 from which the rest 12 is suspended. The special details of construction are relatively unimportant so far as the principle of the invention is concerned. I have shown axle box 11 as provided with a top plate 13 cast integral with the upper half of the box and the rest as supported by bolts 14 which pass through the top plate and engage the rest. I have shown the rest as concave upon its upper surface both longitudinally and transversely for the purpose of supporting a pneumatic cushion 15 of the special form illustrated, that is a cushion resembling in shape a segment of an ordinary pneumatic tire and which may be constructed upon the principles commonly in use in pneumatic tires. It should be understood, however, that any other form of pneumatic cushion may be used if preferred, the rest of course being shaped to correspond with the cushion it has to carry.

16 denotes a platform from which a vehicle body (not shown) may be supported, other forms of springs being interposed or not as preferred.

17 denotes a plate which rests upon the cushion and corresponds with the shape thereof and is connected to the platform by suitable supports as 18. Where a segment-shaped cushion is used I preferably support the ends of the cushion by rings 19 which are cast integral with or rigidly secured to the plate and support and inclose the ends of the cushion.

20 denotes guide tubes open at their upper ends which are carried by and depend from top plate 13, and 21 denotes plungers which are rigidly secured to and depend from the platform and fit closely in the guide tubes, but are short enough so that under no circumstances can the ends of the plungers come in contact with the lower ends of the guide tubes. The ends of the guide tubes are provided with one or more air holes, indicated by 23, which permit the air to be forced out of the guide tubes slowly by the downward movements of the plungers and especially to be drawn inward slowly, thereby retarding the upward movements of the plungers, as will be more fully explained.

The operation will be obvious from the drawing. The rest is rigidly supported from the axle and carries the cushion, which in turn carries the platform and the weight. Swaying of the body of a car or truck, or whatever parts may be carried by the platform, in any direction, is wholly prevented by the guide tubes and plungers, the guide tubes being carried by the axle and the plungers by the platform. It will be seen, therefore, that the only movement of the platform permitted is a vertical movement. Downward movements of the platform are taken up by the pneumatic cushion and also by the resistance of the air in the guide tubes which is forced out through holes 22 relatively slowly by the plungers. The guide tubes and plungers perform an additional and very important function in that they retard the upward movement of the plungers and consequently of the platform as partial vacuums are created under the plungers when their upward movement commences, which can only be filled relatively slowly by the entrance of air through holes 22. The functions of the guide tubes and plungers are therefore in addition to preventing any swaying movement of the body or parts carried by the platform to assist in absorbing the shock of downward movements of the platform and to absorb the shock of upward movements by retarding them through the relatively slow entrance of air into the guide tubes.

Having thus described my invention I claim:

1. A vehicle spring comprising a suspended rest, a cushion seated thereon, a platform provided with a plate that seats on the cushion, and end supports carried by the plate and inclosing the ends of the cushion.

2. A vehicle spring comprising an axle box provided with a suspended rest, a cushion seated on said rest, a guide tube carried by the box and provided with means for restricting the admission and discharge of air therefrom, a platform provided with a plate that seats on the cushion, and a plunger carried by the platform and slidable in the guide tube.

3. A vehicle spring comprising an axle box provided with a suspended rest, a cushion seated on said rest, a platform having a slidable connection with the axle box and provided with a plate that seats on the cushion, and means carried by the plate for engaging and supporting the ends of the cushion.

4. A vehicle spring comprising an axle box provided with a cushion rest, said box being also provided with a guide tube, said tube being provided with means for retarding the admission and exhaust of air to create a partial vacuum therein, a cushion seated on the rest, a platform having a plunger that is slidable in the guide tube, and cushion-engaging means carried by the platform.

5. A vehicle spring comprising an axle box, a cushion rest rigidly suspended therefrom, a guide tube suspended from the axle box and provided with a restricted opening for the admission and exhaust of air, a cushion seated on the rest, a platform provided with a cushion engaging means, and a plunger carried by the platform and engaging the guide tube.

In testimony whereof I affix my signature in presence of two witnesses.

LYMAN D. JONES.

Witnesses:
 A. M. WOOSTER,
 S. W. ATHERTON.